C. L. BETTS.
Creaming Can.
No. 232,927.  Patented Oct. 5, 1880.
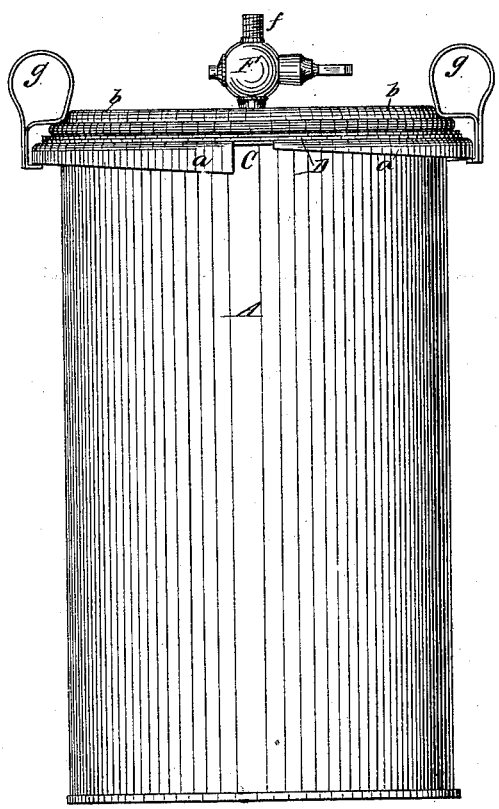
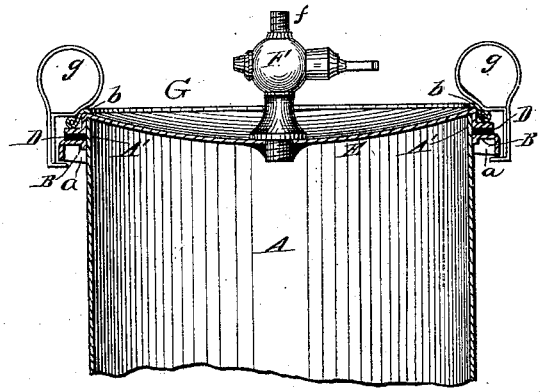
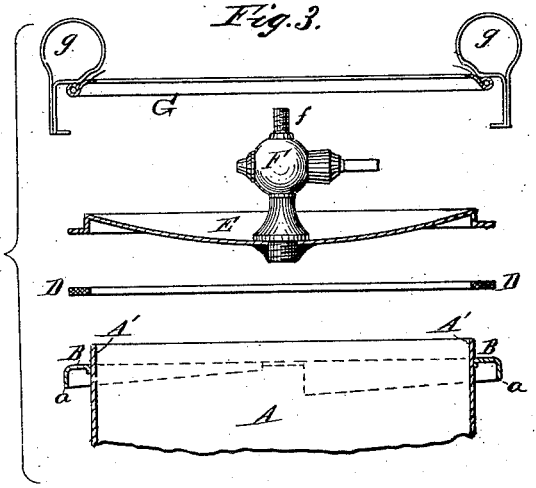
Attest:
Charles R. Searle.
A. M. Pierce.
C. L. Betts,
Inventor:
By Worth Osgood,
Attorney.

UNITED STATES PATENT OFFICE.

CHARLES L. BETTS, OF CHICAGO, ILLINOIS, ASSIGNOR OF ONE-HALF OF HIS RIGHT TO LEWIS F. BETTS, OF SAME PLACE.

CREAMING-CAN.

SPECIFICATION forming part of Letters Patent No. 232,927, dated October 5, 1880.

Application filed February 25, 1880.

*To all whom it may concern:*

Be it known that I, CHARLES L. BETTS, of Chicago, in the county of Cook and State of Illinois, have invented certain new and useful Improvements in Creaming-Cans, of which the following is a full, clear, and exact description, reference being had to the accompanying drawings and the letters of reference marked thereon, the same not having been, to my knowledge, heretofore patented in any foreign country.

My invention has special relation to that class of devices used for containing milk which is set for the purpose of allowing the cream to rise thereon, and ordinarily denominated "cream-cans," in contradistinction to cream-pans, for the reason that a cover is provided to exclude air, &c.; but the improvements are alike applicable to various devices for domestic and other uses wherein it is desired to preserve the inclosed article from the effects of contact with the air, the ravages of insects, such as moths, &c., or to keep the same in an air-tight condition or in a partial vacuum for any reason.

The object of my invention is to produce a device for the above-named purposes which may be easily and cheaply constructed, not liable to get out of order, easily cleaned, and in which the cover may be readily and securely locked against the admission or emission of air by any ordinary person likely to use it.

To accomplish all of this the invention consists, essentially, in a can or receptacle provided near its top or mouth with a projecting flange for the purpose of securing the top or lid in place upon a suitable packing-gasket, the lid being held by a detachable ring from which the locking-hooks depend, and the cover provided with a stop-cock, upon the nipple of which provision is made for the ready application of the suction-tube of an air-pump or other air-exhausting apparatus; and the invention further involves certain new and useful arrangements or combinations of parts and peculiarities of construction, all of which will be hereinafter first fully described, and then pointed out in the claims.

In the drawings, Figure 1 is an elevation of my improved can or receptacle, and Fig. 2 a vertical axial section and partial elevation of the upper part of the same. Fig. 3 is a sectional view, representing the can-top, cover, and locking-ring in detached positions.

Like letters of reference wherever they occur indicate corresponding parts in all the figures.

In setting milk for the purpose of obtaining the cream therefrom it is found that the raising of the cream will be facilitated in point of time, as well as in quantity and quality, if the milk be inclosed in an air-tight receptacle and the air exhausted therefrom. The more perfect the exclusion of air the more rapid and thorough will be the completion of the process. When the air is exhausted from the can the pressure is removed from the top of the milk, and the cream, being of less specific gravity than the milk, speedily rises to the surface. Heretofore no convenient cream-can for dairy or household use has been provided which could be successfully and easily used by ordinary persons with this end in view. The structures heretofore provided are difficult and cumbersome to handle, and, above all, are not susceptible of being easily and thoroughly cleaned, which is a most important consideration.

A represents the body of the can or receptacle, which may be made of sheet metal, cast metal, glass, or any preferred material, and of any desired size and shape. Near the top of the can is a flange, B, soldered, cast, or otherwise firmly secured thereon, and having two or more notches, C, cut therein on opposite sides of the can or receptacle. The edges of the flange turn downward, as at a, parallel with the vertical sides of the can, (supposed to be cylindrical,) and vary in width, gradually sloping at an angle with the horizontal face of the flange from the notches on each side, the slope running from one notch to the other, thus forming a kind of wedge, by which the pressure of the holding-ring upon the cover may be gradually increased.

On the horizontal face of flange B, I place a gasket, D, of rubber or other suitable packing material, for the purpose of making an air-tight joint when the cover or lid is placed thereon. The flange B is located a little distance below the top of the can, allowing the upper part, A', to project up into the recess of the cover. The gasket D should be made to hug this projection A' tightly, so as to more effectually exclude the air.

The cover or lid E may be stamped, spun, cast, or otherwise formed, and it is provided with a rim, b, fitting down over the projection A', and with a flange thereon corresponding with the face of flange B upon the can or receptacle.

The top or lid of the can is preferably made slightly concave, and I place therein a valve, F, air-tight, and provided with a grooved or screw-threaded nipple, f, upon which any rubber tube or other connection may be easily and readily applied, for the coupling therewith of any air-pump or other apparatus for exhausting or forcing in air after the cover is applied and locked in place.

In practice, for convenience I place the valve F in the cover of the can; but, if preferred, it may be placed in the body of the can near the top, thereby answering the same purposes.

By exhausting the air from the interior of the can it (the air) will carry with it any animal odor or other hurtful or deleterious effluvia.

G is a metal ring fitting nicely over the vertical portion of the lid or cover E, and resting upon the horizontal flange thereof. This ring is provided with two or more convenient handles or ears, g g, upon opposite sides, said handles fitting into the notches C when placed upon the cover or lid, the lower ends of the handles extending below the rim a, and being turned inwardly, so that when the ring is placed in position upon the cover the handles or ears pass into the notches in the flange B, and by turning the ring upon the top of the can the handles catch upon the wedge-shaped rim a and firmly press the cover or lid down upon the gasket D upon the flange B. The lid is thus securely and tightly held in place, and if the valve F be closed the can is rendered perfectly air-tight.

It will be observed that all the parts are simple and smooth, and that they may therefore be very easily cleaned.

In a receptacle so constructed and arranged, if milk be placed therein, the cover applied and locked or wedged down tightly, and the air exhausted through the valve F, (the same being immediately afterward closed,) the before-mentioned beneficial results in the raising of cream will follow the use of the improved can.

Any simple form of air-pump will answer for withdrawing air from the can, and very good results will ever follow the withdrawal of as much as possible by the mouth, using a short section of rubber tube upon the nipple f.

If, for any reason, it be desired to maintain the air within the can under pressure, it will be found to retain compressed air with the same facility that it prevents admission.

The same form of improved can may be adapted for containing any article in an air-tight condition.

The improved device is useful for many purposes, among which are named the preservation of furs and the like in a partial vacuum, thus preventing damage by insects, &c.

When intended for the delivery of milk in small quantities, as in cities, the air may be exhausted from the cans at the depot, when the cream will be ready set at about the time the can is delivered; or, if the air be not exhausted, the milk may be conveniently withdrawn through the valve F at the top as wanted for use, the remainder being always hermetically sealed. By making the cans of such size as to exactly hold the quantity required, and by filling them entirely, leaving no space for air, and placing the cover thereon, the contents are under pressure, and churning during shipment is avoided.

When warm milk or milk fresh from the cow is placed in the can the heat therefrom readily rarefies the air and expels it from the can, carrying away with it animal odors, &c., the valve being left open a short time for this purpose and closed before the milk entirely cools, the final cooling causing a partial vacuum in the can.

It will be observed that the form of clamping device used enables me to leave the interior of the can perfectly smooth—an advantage in the matter of cleaning the interior as well as in the matter of removing the cream.

Where numbers of the improved can are employed for raising cream it will be found to be advantageous to exhaust the air and then invert the cans in some convenient form of rack fitted for that purpose. After the cream is set the milk may be easily withdrawn through the valve, leaving the cream in the dish-shaped cover, which may then be detached and emptied of its contents; or, if preferred, for the purpose of withdrawing the milk, a simple tap may be made in the bottom of the can.

Thus it will be seen that the improved device admirably answers the several purposes and objects of the invention, as previously stated.

In previous forms of cream-cans from which it has been proposed to exhaust the air the cover has been maintained in place by the atmospheric pressure, which, in a device of the character herein shown, is not sufficient for the purpose of holding the cover, except when in an upright position. It will be observed that the locking device holds my cover securely, so that in inclining the can or inverting it, as explained, there will be no danger of displacement or disarrangement of said cover.

I am aware that the bayonet-joint and wedge-shaped locking-lugs have been employed in can and jar covers, and I do not wish to be understood as making any claim to those features alone, except as in the particulars hereinafter stated.

Having now fully described my invention, what I claim as new, and desire to secure by Letters Patent, is—

1. In a cream-can intended for maintaining milk in a partial vacuum, the combination, with the body of the can, of an air-tight cover having a vertical rim and a stop cock or valve, the cover being secured in place upon a suitable packing-gasket, and being centrally depressed, substantially in the manner shown and described.

2. In a cream can or receptacle, the sheet or cast metal body, smooth upon its interior, with the projecting flange soldered or cast thereon, said flange being notched for the reception of the handles of the binding-ring holding the cover or lid thereon, the vertical portion of the flange being wedge-shaped, substantially as and for the purposes set forth.

3. In a can or receptacle of the character herein specified, the combination of the metal body with the flange and wedge-shaped rim soldered or cast thereon, the ring bearing the handles or ears, the rubber gasket, and the metal cover or lid bearing the valve therein, substantially as and for the purposes set forth.

4. The herein-described can or receptacle A, having smooth interior surface, the notched flange B, secured upon the exterior and below the top thereof, the rubber gasket D, the top E, with depending vertical rim $b$ and horizontal flange, the locking-ring G, detachable from said flange and cover, and the valve F $f$, secured upon the cover, all substantially as shown and described.

In witness that I claim the foregoing I have hereunto set my hand in presence of two witnesses.

CHARLES L. BETTS.

Witnesses:
C. A. SAWYER,
H. H. COLCOTT.